Feb. 16, 1960 L. L. REDDICK ET AL 2,925,223
SPRAY CLEANING
Filed April 14, 1954 4 Sheets-Sheet 1

INVENTORS
LEONARD L. REDDICK
RUSSELL M. FORT
EUGENE J. BALDI
HENRY F. ZIEGELBEIN
BY Cushman, Darby & Cushman
ATTORNEYS

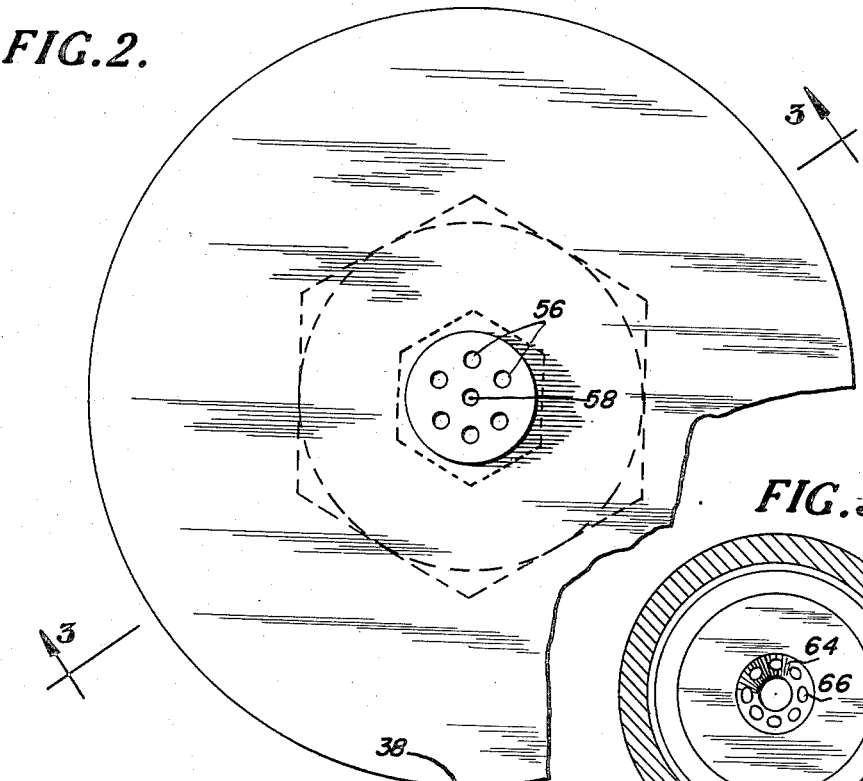
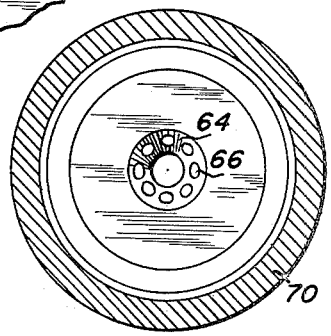
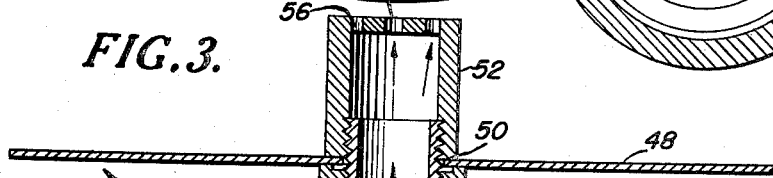
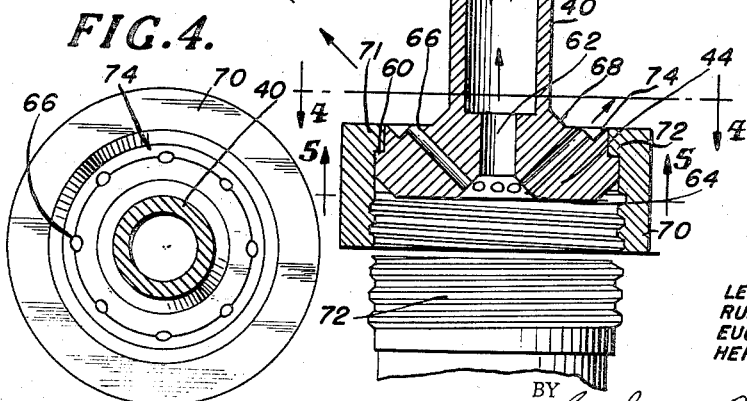

Feb. 16, 1960
L. L. REDDICK ET AL
2,925,223
SPRAY CLEANING
Filed April 14, 1954
4 Sheets-Sheet 3
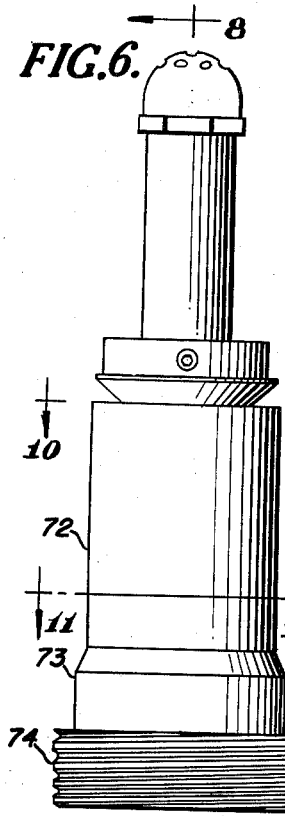
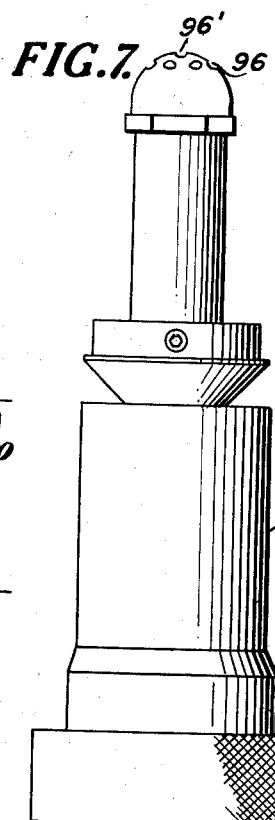
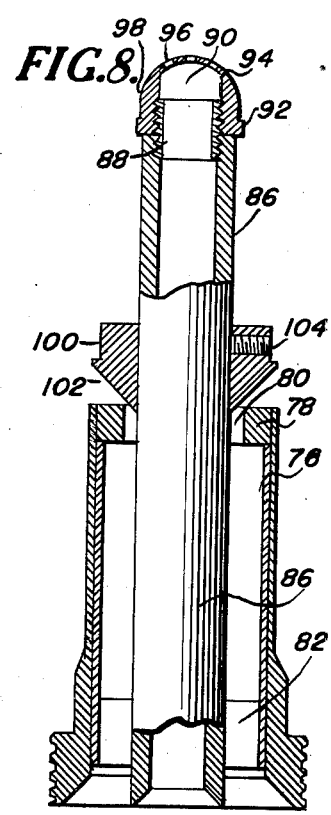
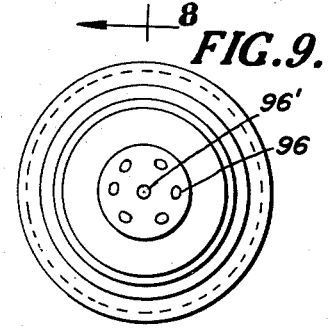
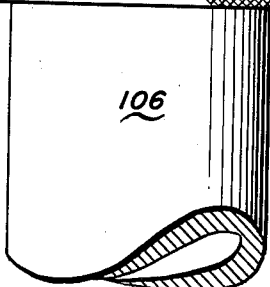
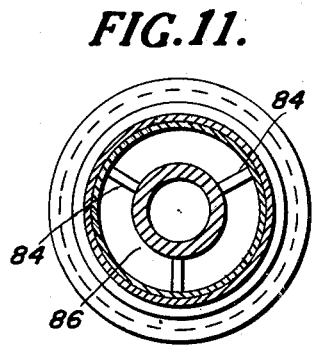
INVENTORS
LEONARD L. REDDICK
RUSSELL M. FORT
EUGENE J. BALDI
HENRY F. ZIEGELBEIN
BY Cushman, Darby & Cushman
ATTORNEYS

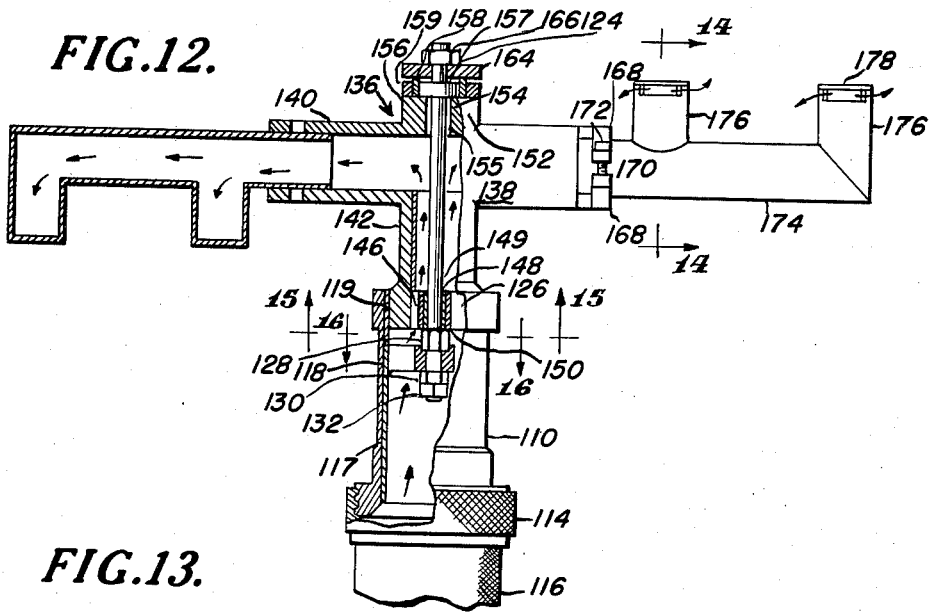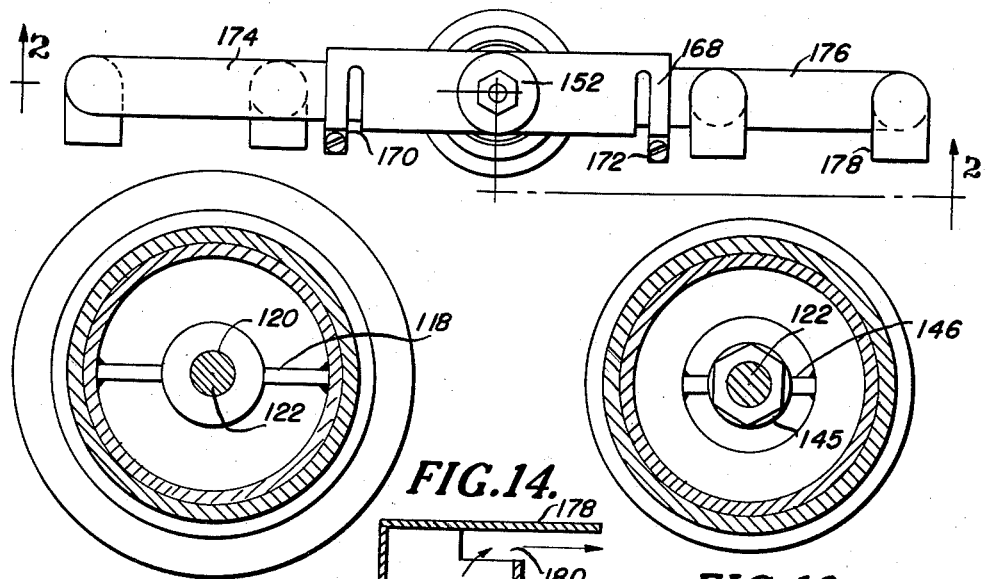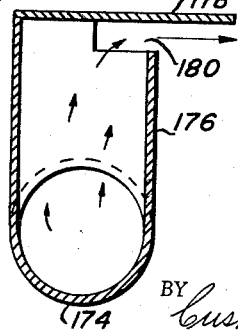

United States Patent Office 2,925,223
Patented Feb. 16, 1960

2,925,223

SPRAY CLEANING

Leonard L. Reddick, Russell M. Fort, and Eugene J. Baldi, Springfield, and Delbert K. Harmon, Ozark, and Henry F. Ziegelbein, Monett, Mo., assignors to Producers Creamery Company, Inc., Springfield, Mo., a corporation of Missouri Application April 14, 1954, Serial No. 423,014

1 Claim. (Cl. 239—441)

This invention relates generally to the cleaning of vacuum evaporative equipment known to the trade as vacuum pans or evaporators. Vacuum pans or evaporators are used in the vacuum evaporation or condensing of many food products including fruit juices, milk, etc. One of their major uses is in the process of making various milk products such as evaporated milk, condensed whole milk, condensed skimmed milk, condensed whey, condensed ice cream mix, etc.

Due to the nature of the products handled, such equipment must be kept scrupulously clean. Perfect cleanliness is required to avoid any biological contamination as well as to protect the color and flavor of the product. Such cleanliness is also required to insure proper operation of the equipment. The growth of micro-organisms and organic residues normally encountered in vacuum evaporative equipment is well-known to the trade and the deleterious effect these micro-organisms may have on the finished product, which is processed in this equipment, is also well-known.

The presence of organic residues and the effect they will have on the efficient functioning of such equipment is recognized. The operation of vacuum evaporative equipment is obtained by drawing a vacuum in an enclosed chamber containing a series of coils or in some cases a group of tubes. Products such as milk, or its by-products, or other liquid foods are introduced into the chamber under vacuum, the product is heated by being passed over the coils or through the tubes. Steam is introduced into the coils to produce the heat or is introduced around the tubes and this heat is used in either case to boil the product under vacuum. A vacuum is maintained in the chamber where the product is being condensed and as the boiling point of the product is reduced under vacuum, excess water is removed from the product at temperatures below the range of heat decomposition thus preserving the flavor of the product. Some organic residues will attach to the tubes or coils which are used as heat exchangers and due to the surface temperature of the tube or coil will burn, forming a deposit that is difficult to remove. If this deposit is not removed, it will act as an insulator since by its nature said deposit is not a conductor of heat but prevents passage of heat from the tubes or coils to the product being boiled under vacuum. Since the function of evaporative equipment depends upon the rapid transfer of heat, any residue of deposit on the equipment will seriously impair the operation. This invention will answer the problems encountered in cleaning vacuum evaporated equipment by leaving the equipment free of all harmful residues that can act as nutrients for micro-organisms or act as insulators in running proper heat exchange. It has been the practice to clean such vacuum evaporative equipment by placing a quantity of water into the vacuum chamber to which has been added an alkali cleaner usually in the form of sodium hydroxide. Sodium orthosilicate has also been used as well as sodium hydroxide treated with complex phosphates such as tetrasodiumpyrophosphate, sodium tri-polyphosphate and others. Surface active agents, or wetting agents, of various types have been used in conjunction with the mentioned cleaners. After the cleaning solution has been introduced to the vacuum evaporative equipment, the solution is usually boiled under vacuum to permit the solution to dissolve the residue left in the pan after processing. This boiling is accomplished by introducing steam into the tubes or into the coils which act as heat exchangers to heat the solution. This boiling solution of water and a cleanser together with the convecting currents generated by the heating has a definite cleaning effect but such a treatment has inherent disadvantages. The temperature required to dissolve the residue left in the tubes and on the coils is close to atmospheric boiling temperature. Due to the fact that the solution is being boiled under vacuum, the temperature of the solution will be much lower than boiling temperature of water at atmospheric pressure and said temperature will range from 130 to 175° F. Such temperature range is insufficient to effectively remove the residue. It has also been found that the introduction of heat through the steam coils or around the tubes increases difficulty in cleaning since the high temperature of the metal surface in contact with the lower temperature of the cleaning solution will form a vapor seal between the heat exchange surface and the solution making penetration of the soil more difficult and slow. It has also been found that the product condensed in the pan is somewhat tacky and has a pronounced tendency to adhere to the tubes or coils or other parts of the evaporative chamber. Cleaning other parts of the evaporator chamber is very difficult since much of the evaporative chamber is so constructed as to be above the limits of the boiling solution and under usual cleaning practice it is almost impossible to apply the solution to these surfaces. The cost involved in cleaning vacuum evaporative equipment under normal accepted procedures is exorbitant. In order to effectively boil the cleaning solution under vacuum, large amounts of water are required which in turn require large amounts of cleaner to effectively treat the water. Inasmuch as live steam under high pressure is required to draw a vacuum in the evaporator the cost of fuel is an important factor. The accepted fuel cost of operating vacuum evaporative equipment normally found in most food plants ranges from $3.00 to $10.00 per hour. Excessive labor is also required during the usual cleaning operation due to the necessity of brushing the tubes or coils as well as other surfaces of the chamber.

A thorough cleaning and removal of all solid residue or residual material by the known boiling method which requires such a prolonged period resulting in the fact that the inactivity or nonproductiveness of the equipment constitutes a serious economic factor in the business of producing condensed liquid foods. It may readily be seen that there has been a definite need for improved methods and apparatus for the type of cleaning and decontamination of such evaporative pans. It is therefore an object of this invention to provide new and improved apparatus for rapidly cleaning and decontaminating the interior operational portions of an evaporative vacuum pan.

It is a further object of this invention to provide a new and improved method of cleaning and decontaminating such evaporative pans.

These and other objects of our invention will be fully understood from the following detailed description of typical preferred forms and applications of this invention throughout which description reference is made to the following drawings in which:

Figure 2 is a top plan view of a spray nozzle;

Figure 3 is a section taken along the lines 3—3 of Figure 2;

Figure 4 is a section taken along lines 4—4 of Figure 3;

Figure 5 is a sectional view taken along lines 5—5 of Figure 3;

Figure 6 is a side elevational view of a modified form of nozzle;

Figure 7 is a side elevational view of this nozzle connected to a standard feed pipe, and having the conical dispersion member slightly raised;

Figure 8 is a section taken along lines 8—8 of Figure 6;

Figure 9 is a top plan view of the nozzle shown in Figure 6;

Figure 10 is a section taken along lines 10—10 of Figure 6;

Figure 11 is a section taken along lines 11—11 of Figure 6;

Figure 12 is a side elevational view, with portions broken away and shown in section to more clearly illustrate the invention of another modified form of nozzle;

Figure 13 is a top plan view of the nozzle shown in Figure 12;

Figure 14 is a section taken along lines 14—14 of Figure 12;

Figure 15 is a section taken along lines 15—15 of Figure 12;

Figure 16 is a section taken along lines 16—16 of Figure 12, and

Figure 1:
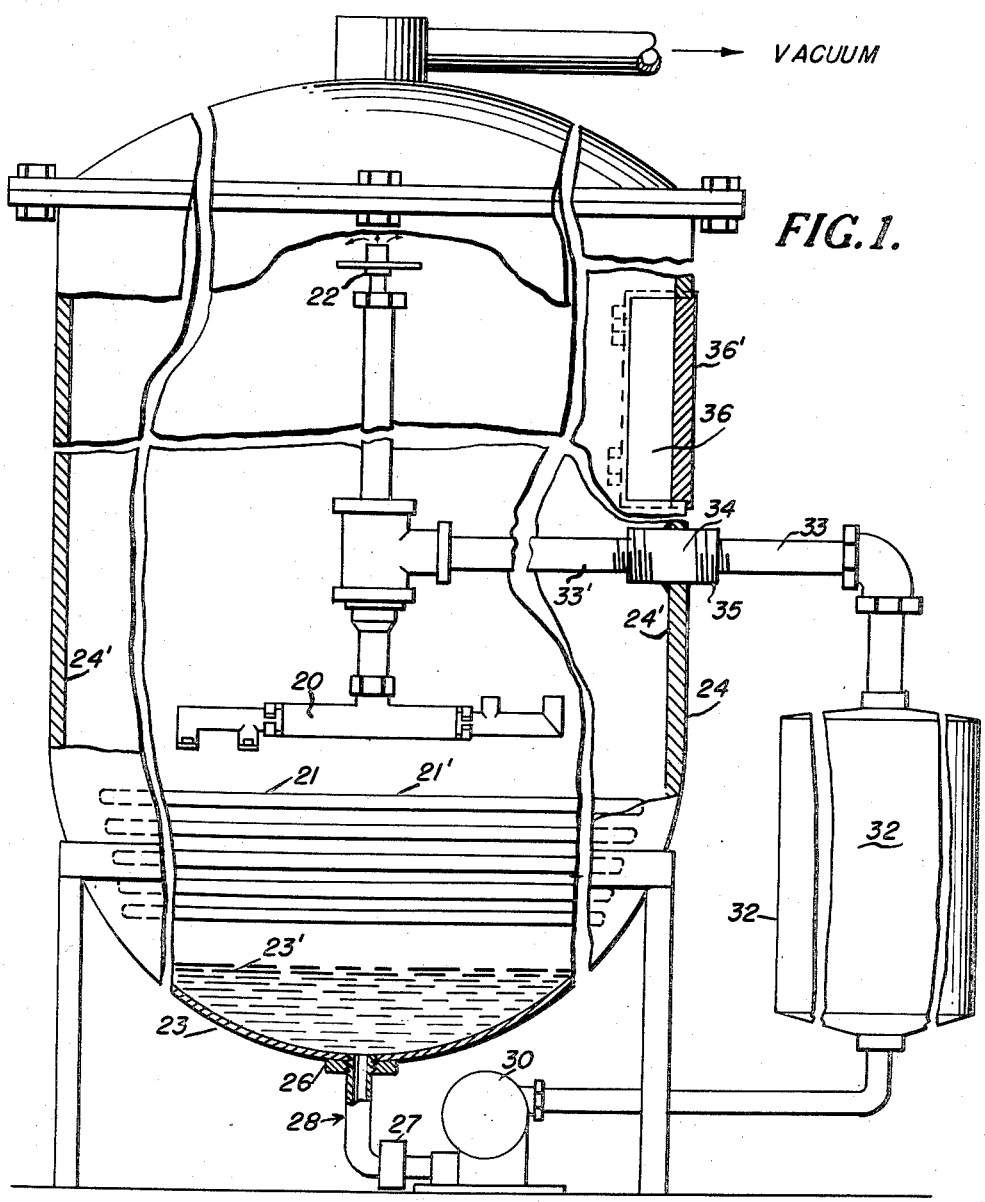
Figure 1 is a side elevational view, taken in section, of a standard evaporating pan provided with spray cleaning apparatus in accordance with our invention.

Referring to Figure 1 of the drawings, a revolving spray unit generally indicated at 20, e.g., as shown in Figures 12 and 13, and a fixed spray unit, generally indicated at 22 and shown, for example, in Figures 2 and 3 or 6, 7 and 8, are operatively disposed within an evaporating pan or vacuum chamber indicated at 24.

The spray units are of such construction and are so positioned with respect to the interior wall surface 24' of the vacuum chamber that they throw a shearing stream of cleaning liquid upon the wall surface and at the same time produce a constantly flowing film thereon which flows from the top of the chamber down the side walls thereof to the bottom 23 of the chamber where the cleaning fluid collects as shown at 23' for discharging from the vacuum pan. In this connection, the vacuum pan including the coils 21 may be readily cleaned within the matter of one or two hours as compared to the relatively much longer cleaning times now required where the heating coils 21 are utilized to boil the cleaning liquid within the vacuum pan and thereby remove soil and collected matter from the wall surface.

Figure 17:
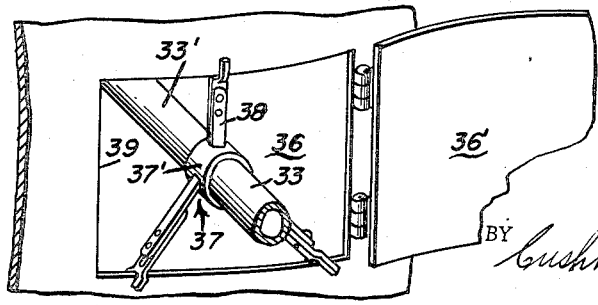
Figure 17 is a perspective view showing clamping means for attachment in the sill portion of the vacuum pan door for supporting and positioning the cleaning apparatus within the pan.

The cleaning liquid which may be of any suitable character such as a mixture of caustic soda and sodium gluconate or a mixture of caustic soda and dextrin is prepared as an aqueous solution and introduced to the pump 30 from whence it is delivered to a heating unit 32 and then through the conduit 33—33' to the vacuum pan. Preferably a spud 34 is fixed in the wall of the vacuum pan and this spud has threaded ends 35 which, when the vacuum pan is being operated, are closed by suitable caps not shown. When it is desired to clean the vacuum pan, the caps are removed and the conduit 33 is connected to the outside end of the spud 34 while the conduit 33', which carries the spray devices 20—22, is connected to the inside end of the spud 34. The spray devices are introduced through the usual door opening 36 having a door 36' and when the spud construction 34 is used, the door 36' is closed during the spray cleaning. When, however, the spud construction is not available, a clamp 37 is provided having a central opening or hub 37' to receive the conduit 33—33' which would be a continuous pipe, as shown in Figure 17. The radially extending legs 38 of the hub 37' are extensible so as to properly engage the sill portions 39 of the door opening and firmly center the conduit 33—33' in the door opening 36. A suitable canvas shield, not shown, covers the door opening 36 when this type of installation is used.

As explained, the use of sprays which direct with force a stream of cleaning fluid upon the entire interior surface of the vacuum pan and also provide a film moving over the wall of the vacuum pan from the top to the bottom represents a complete change from prior practice. As will be appreciated, this cleaning operation is a continuous one in that the cleaning liquid is continuously removed from the supply 23' in the bottom of the vacuum pan, heated usually at a temperature of 175 to 210° F. and returned to the spray devices and recirculated. A filter 27 may be used if desired to filter the liquid as it leaves the vacuum pan. A temperature of 160° F. using a 2 percent caustic solution is a good sterilizing medium but for cleaning purposes the temperature is preferably about 175° F.

As explained, the high pressure spraying of the detergent solution will rapidly and effectively remove all of the solid and semi-solid residue material that collects on the interior surfaces of the evaporator pan including the surfaces 21' of the heating coils 21 and the wall 24' of the pan. After the high pressure spraying of the evaporator pan, e.g., for about sixty minutes, the interior may then be expeditiously sterilized in a conventional fashion, i.e., by chlorine, pressure steam wherein steam at ten pounds pressure is introduced to the closed pan, and, in many cases, the sterilizing is unnecessary due to high temperature of solution.

The method requires only one set of spray nozzles to service a large number of evaporating pans as the nozzle assemblies may be removed from the pans at the termination of the cleaning process and immediately transferred to some other pan needing a similar expeditious cleaning operation.

Referring more particularly to the spray nozzles, we have shown one embodiment of our proposed nozzle in Figures 2, 3, 4 and 5. Generally speaking, the nozzle comprises a hollow columnar liquid conveying member or standard having one end externally threaded and the other end provided with an exterior circular collar. The columnar member carries an axially apertured rose secured to the threaded end and supports a deflector shield between a locking nut and the nozzle tip. The base or shoulder of the columnar member is provided with obliquely extending radial apertures adapted for the transmission of a fluid stream from within the pressure system and against the deflector shield.

Referring more particularly to Figure 3, a hollow columnar member 40 is formed with externally disposed screw threads 42 at one end and with a substantial exterior collar portion at the other end, indicated generally at 44. The threaded portions 42 are threadably engaged with hexagonal nut 46, the latter being disposed a substantial distance from the free end of the columnar member 40. Deflector disc 48, having a centrally disposed aperture 50, is adapted to loosely fit over the columnar member 40 and against the hexagonal nut 42 in coaxial relationship thereto. Rose 52 comprises an internally threaded cylindrical member having one end closed. The closed end is provided with five apertures 56 disposed in a circle coaxial with the nozzle tip 52 and the standard 40, as well as with a single centrally disposed aperture 58. When the rose is threadably engaged with the end of the collar member 40, the disc will be firmly supported between the nut 46 and the rose 52. It may be readily seen that the exact longitudinal location of the disc on the hollow collar member may be selectively adjusted by the appropriate manipulation of the nut and the rose on the threaded portion 42.

At the other end of the hollow columnar member, the center collar 44 is provided with a peripheral sealing shoulder 60. The collar portion is also provided with a centrally disposed fluid passageway 62 having a diameter smaller than the interior of columnar portion 40. The free end of the collar's fluid passageway is flared outwardly to form a frusto-conical seat 64. The collar is further provided with eight radial ports 66, extending at an acute angle relative to the axis, which connect the periphery of the conical seat 64 with the inner planar surface 68 of collar 44. As best shown in Figure 3, these ports are so disposed that their axes intersect the dispersion disc so that a stream of fluid passing through the ports will impinge upon the dispersion disc and will be radially deflected thereby.

The collar portion 44 is adapted to be securely fixed in abutting relationship to any suitable threaded outlet by hexagonal nut 70 which carries an interiorly disposed collar 71 which may be drawn down into tight fitting relationship with complementary shoulder 60.

In operation, a suitable fluid cleaning solution under a high pressure is introduced into the nozzle by the conduit lines 72 threadably engaged with hexagonal nut 70. It may be readily seen that a portion of the pressure fluid will be conducted through ports 66 and that its velocity will cause the stream to impinge against the underside of the deflector shield 48 and to be thereby dispersed substantially radially of the nozzle. Another portion of the pressure fluid will be conducted through the reduced fluid passage 62, and apertures 54, 56 in axially extending streams.

The ports 66 may be drilled or otherwise formed in the collar 44. It has been found that the drilling thereof is greatly facilitated if a V-shaped circular notch 74 is first formed in the inner planar surface 68 of the collar, to form a support for the drill points. The notch 74 is simply to facilitate manufacture and has no effect upon the functioning of the nozzle.

It may be readily seen that it is within the scope of this invention to vary the acute angle at which the ports 66 may be disposed. The greater the acute angle from the axis of the standard, the wider will be the dispersion of the sprayed cleaning material.

In another embodiment of our invention, we provide a slightly modified form of spray nozzle. Generally speaking, this nozzle comprises a longitudinally extending structure having a wide angle fluid dispersion rose on its end and a radial dispersion port circumambient the intermediate portions.

As shown in Figure 6, the modified nozzle comprises a longitudinally extending base member or standard 72 having an enlarged portion 73 carrying externally disposed threads 74.

As best shown in Figure 8, the standard encloses in close relationship an interiorly disposed cylindrically formed inner sleeve 76 and an interiorly disposed ring member 78 defining aperture 80. The inner sleeve 76 carries at one end a spider 82 comprising three radially disposed arms 84. Fixed to the spider 82, by welding or casting, is a centrally disposed longitudinally extending tube 86 which extends through apertures 80 and beyond the end of sleeve member 76 for a substantial distance. The free end of the tube 86 is provided with interiorly disposed screw threads carrying nipple 88. A rose 90 is formed with a hexagonal base 92 and a semispherical dispersion dome 94, the dome being provided with six radially arranged apertures 96 and a centrally disposed aperture 96'. The hexagonal base 92 and the dome portion 94 are interiorly threaded at 98 and engage nipple 88.

Disposed upon the tube 86 is a dispersion collar 100 having the lower portion of its periphery tapered (at 102) inwardly toward its lower end, the enlarged base 73 being considered the lower portion of the entire nozzle. The collar is provided with an Allen set screw 104 extending from the outer to the inner periphery so that the collar may be adjusted to any appropriate position along tube 86 and then securely fixed in position to withstand the impinging force of the fluid, as will be discussed hereinafter.

As shown in Figure 7, the base 72 and thread 74 may be screwed into a standard conduit 106 which is in communication with the pump 30 discussed hereinbefore. A portion of the cleaning fluid will pass through the tube 86 to the rose 90 and will be dispensed axially and radially into the evaporating pan through apertures 96. Another portion of the fluid will pass between the exterior to tube 86 and the interior sleeve 76, through aperture 80, and will impinge against the tapered surface of the dispersion collar 100. The fineness, velocity, and direction of this spray may be controlled by the adjustment of the dispersion member to the desired position on the tube 86.

In Figures 12 to 16, we have illustrated another embodiment of a spray unit for use in the rapid cleaning of evaporating pans. Generally speaking, this nozzle comprises an improved fluid reaction revolving spray having a base, which for purposes of description will be considered its lower extremity, supporting a T-shaped freely revolving head.

Referring more particularly to Figure 12, a heavy circular hollow base or standard 110 has the lower extremity thereof externally threaded to accommodate an interiorly threaded associated end or outlet 114 of the pressure fluid supply pipe 116. The smooth bore of the base 110 is provided with two interiorly disposed sleeves secured in position by the close association of the respective parts. The first of these sleeves 117 extends from the threaded end of the base approximately four-fifths of the distance along its longitudinal axis. The second sleeve 119 extends from the end of the first sleeve to the unthreaded end of the base. The first mentioned interiorly disposed sleeve is provided with a diametrically extending cross arm 118 having an enlarged central portion defining a circular aperture 120, the aperture being coaxial with the base member 110. Axially disposed within aperture 120 is longitudinally extending spindle or rod 122 threaded at its upper end at 124 and its lower end 126. The rod is fixed to the cross arm 118 by hexagonal bolt 128 threadably engaged with the rod directly above the cross arm, and the hexagonal bolt 130 and locking hexagonal bolt 132, both threadably engaged with the rod immediately below the cross arm. It will be readily seen that proper manipulation of these last-mentioned bolts tightly and non-rotatably fixes rod 122 in co-axial alignment with aperture 120 and base 110.

The rotating head portion, indicated generally at 136, comprises a T-shaped member 138 having arms 140 and body portion 142, all formed of cylindrical stock of substantially equal diameter. The body portion has an enlarged base 144 which has an external diameter only slightly smaller than the interior diameter of sleeve 119, so as to form a close but free moving fit therewith. The interior of this body portion is provided with diametrically extending cross arms 146 having an enlarged central portion 145 defining circular aperture 148 coaxial with the base 110 and rod 122. The aperture is provided with a sleeve bearing 149 of babbitt, or other suitable material, which is adapted to form a free fit with rod 122. The bottom surface 150 of the cross arm 146 is smoothly finished and acts as a bearing surface on the upper surface of nut 128 so that the latter supports the entire head portion with a minimum of friction.

The T 138 is further provided with a boss 152 extending co-axial with the body 142 and on the opposite side therefrom, which is provided with a centrally disposed aperture 154 co-axial with rod 122. The aperture is provided with a sleeve bearing 155 of suitable material having a bore dimensioned to freely fit the rod 122 which extends therethrough. The top of the lug is machined smooth in a plane extending transversely of its axis at 156 to provide a bearing surface for the sealing rings which will now be described.

As best shown in Figure 12, the rod 122 is provided with three mutually co-axial and circumferential rings. The interior ring 157 may be constructed of a hard and smooth material such as stainless steel, the intermediate ring 158 may be constructed of a liquid lubricated material such as hard rubber or graphite, and the outer ring 159 may be composed of a non-corrosive material such as brass. The intermedite ring is constructed with a longitudinal length slightly greater than the inner or outer rings so as to provide the only bearing surface for washer 164 superposed thereon. The entire sealing assembly of the three sealing rings and the washer is held against the boss 152 by hexagonal nut 166 threadably engaged to the upper end of the rod 122.

The arms of the T are provided with integral clamps comprising split ring 168 provided with lugs 170 which may be drawn together by the action of bolt 172.

As best shown in Figures 12 and 13, the clamps 168 are adapted to grip extension arms 174 which are inserted within the arms 140 of the T. It will be understood that arms of any suitable length may be selected, depending on the area to be sprayed or the volume of the enclosure being cleaned. The extension arms 174 are cast or formed with hollow bosses 176 extending at right angles from the axis thereof.

As best shown in Figure 14, the bosses are provided with dispersion covers or shields 178 extending a substantial distance to one side of the bosses. This side of the boss has a portion of the end of the sidewall cut away to provide a discharge slot 180 for the cleaning fluid.

As best shown in Figure 13, the bosses are arranged with slots on a given extension arm facing in the same direction, and in a direction opposite to that of the slots of the other extension arm, so that the reaction of the discharging cleaning fluid will impart a rotational motion to the entire head 136 about the fixed rod 122.

The extension arms 174 may all be constructed with an identical configuration as a given arm may be rotated within the arms 140 to an angular position 180° away from the other arm so that, for example, one arm will have its bosses extending downwardly and the other arm will have its bosses extending upwardly.

As discussed hereinbefore, the cleaning of the milk evaporation pans by the use of a high pressure spray demands apparatus for properly distributing the cleaning fluid to all portions of the pan. The three embodiments of cleaning fluid spray units described herein are each particularly adapted for such use and may be used separately, sequentially or jointly as the shape or condition of the evaporating pan may dictate.

Having described only typical preferred forms and applications of our invention, we do not wish to be limited or restricted to specific details herein set forth but wish to reserve to ourselves any variations or modifications that may appear to those skilled in the art and falling within the scope of the following claim.

We claim:

A spray nozzle for cleaning the interior of vacuum evaporating pans, said nozzle including a tubular standard having a lower opened end provided with an externally enlarged threaded portion, said standard having an upper end provided with a reduced opening, a non-perforated tube extending axially through said standard from the lower end thereof and a substantial distance beyond its upper end and spaced from said reduced opening, said tube having an axially adjustable dispersion collar positioned above said standard and provided with a tapered lower surface arranged to extend into said opening and co-acting with the wall thereof to provide an upwardly and outwardly disposed annular inclined orifice for discharging liquid radially from an intermediate portion of the nozzle, means for adjustably connecting said collar to said tube, a rose connected to the upper end of said tube and provided with a curved dome having radial fluid spray openings so as to form a wide angle discharge for fluid dispersion, and a fluid supply conduit connected to the lower end of said standard for conducting separately a portion of the cleaning fluid through said tube so as to be discharged axially and radially into the evaporating pan and another portion of the cleaning fluid passing between said tube and the inner wall of said standard so as to discharge radially through said annular inclined orifice and without mixing with the cleaning fluid passing through said tube.

References Cited in the file of this patent

UNITED STATES PATENTS

| | | |
|---|---|---|
| 555,573 | Haas | Mar. 3, 1896 |
| 558,568 | Sanders | Apr. 21, 1896 |
| 573,721 | Swift | Dec. 22, 1896 |
| 871,191 | Southam | Nov. 19, 1907 |
| 930,800 | Sanger | Aug. 10, 1909 |
| 1,490,316 | Dougherty | Apr. 15, 1924 |
| 1,732,955 | Swendeman | Oct. 22, 1929 |
| 1,753,522 | Larsen | Apr. 8, 1930 |
| 1,806,740 | Butterworth | May 26, 1931 |
| 1,823,277 | Lum | Sept. 15, 1931 |
| 2,255,688 | Tavone | Sept. 9, 1941 |
| 2,314,754 | Baird | Mar. 23, 1943 |
| 2,416,226 | Schultz | Feb. 18, 1947 |
| 2,443,721 | Butcher | June 22, 1948 |
| 2,484,794 | Reuter | Oct. 11, 1949 |
| 2,494,067 | Snowden | Jan. 10, 1950 |
| 2,557,206 | Spender | June 19, 1951 |
| 2,563,962 | Rieger | Aug. 14, 1951 |